N. PYNN.
SELF CENTERING RAILWAY TRUCK.
APPLICATION FILED NOV. 21, 1916.
1,228,131.
Patented May 29, 1917.
3 SHEETS—SHEET 2.
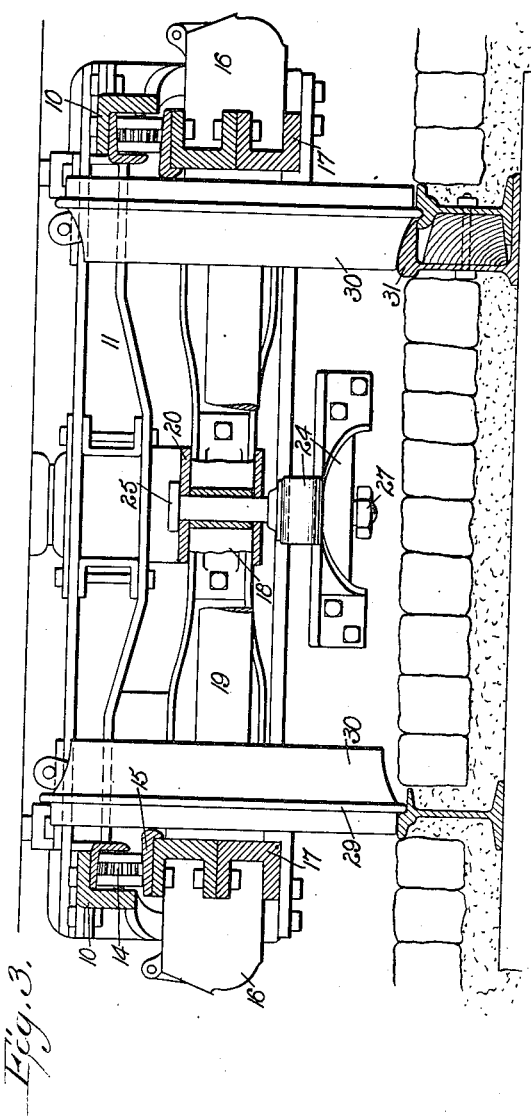
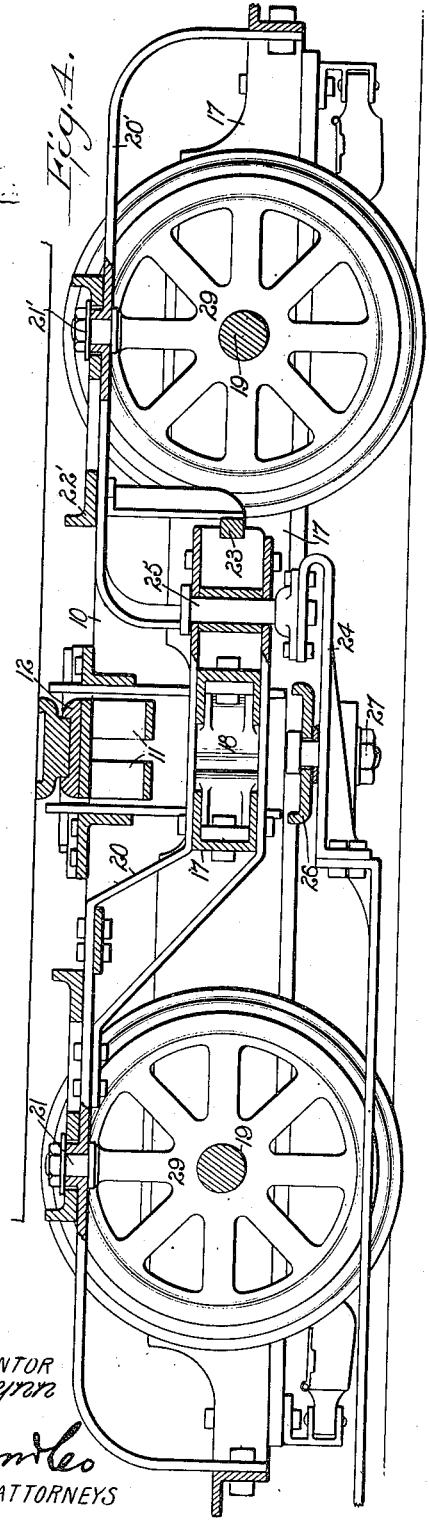
WITNESSES
INVENTOR
N. Pynn
BY
ATTORNEYS N. PYNN.
SELF CENTERING RAILWAY TRUCK.
APPLICATION FILED NOV. 21, 1916.
1,228,131.
Patented May 29, 1917.
3 SHEETS—SHEET 3.
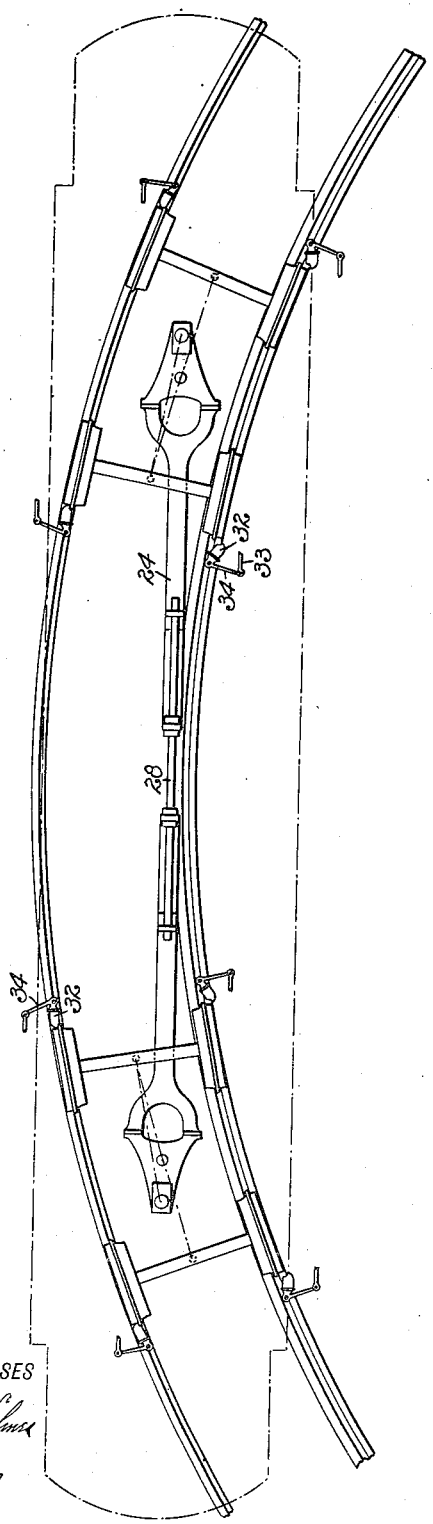
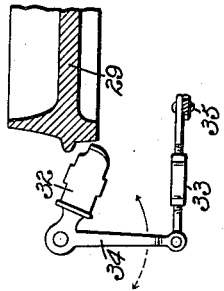
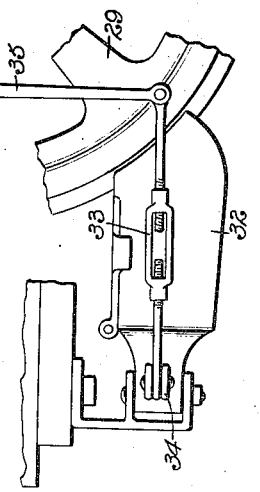
WITNESSES
INVENTOR
N. Pynn
BY
ATTORNEYS

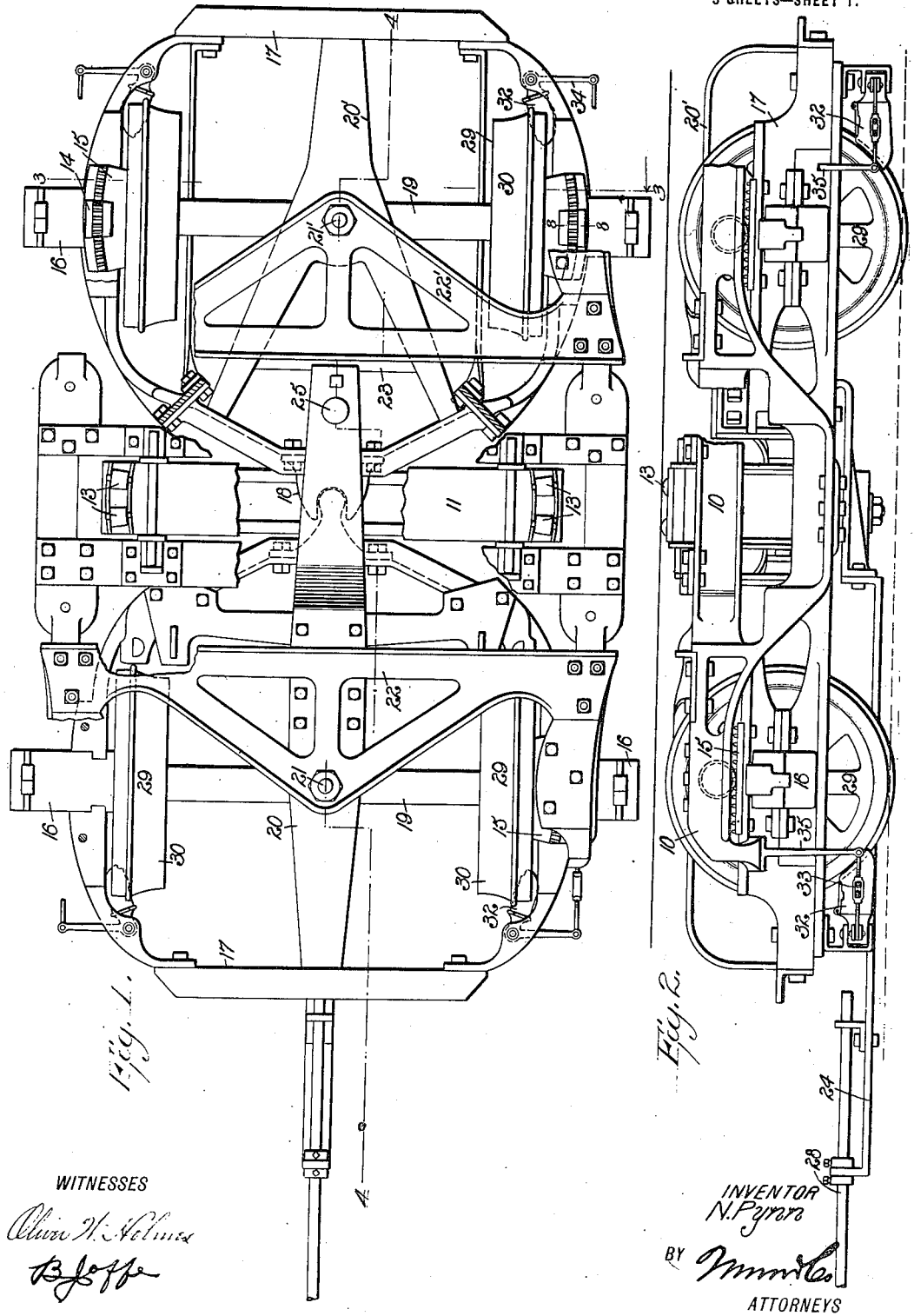

UNITED STATES PATENT OFFICE.

NEWMAN PYNN, OF BROOKLYN, NEW YORK.

SELF-CENTERING RAILWAY-TRUCK.

1,228,131.  Specification of Letters Patent.  Patented May 29, 1917.

Application filed November 21, 1916. Serial No. 132,573.

*To all whom it may concern:*

Be it known that I, NEWMAN PYNN, a subject of the King of Great Britain, and a resident of the city of New York, borough of Brooklyn, in the county of Kings and State of New York, have invented a new and Improved Self-Centering Railway-Truck, of which the following is a full, clear, and exact description.

My invention relates to railway trucks the axles of which are adapted to become radial to the curvature of the track and thereby diminish the resistance to motion and reduce wear on the track and wheels and other truck parts.

An object of the invention is to provide a simple and efficient truck the axles of which will automatically converge to become radial when a car swings a curve.

Another object of the invention is to provide lubricating means for the car wheels becoming operable when the truck moves on a curve.

A further object of the invention is to provide a mutual control for the trucks of a car so arranged that the convergence of the axles of the truck engaging the curve is transmitted to the axles of the other truck ready to engage the curve.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a plan view of a truck embodying my invention, certain parts of the truck being broken out to show the details of construction;

Fig. 2 is a side elevation of the truck, certain parts thereof being broken out to show the details of construction;

Fig. 3 is a transverse section on line 3—3, Fig. 1;

Fig. 4 is a longitudinal section on line 4—4, Fig. 1;

Fig. 5 is a diagram showing the position of the truck axles on the curve and the lever connecting the trucks by which the convergency of the axles of one truck is transmitted to the other trucks, the view also showing the position of the lubricating means during the movement of the truck over the curve;

Fig. 6 is an enlarged side elevation of the lubricating means;

Fig. 7 is a top plan view of the lubricating means and the means for operating the same; and Fig. 8 is a section on line 8—8, Fig. 1.

Before proceeding to a more detailed description of my invention it must be clearly understood that although the truck as shown is designed for street cars it may be as easily used in connection with railway cars, with substantially no modification.

Referring to the drawings, 10 is a rectangular truck frame which is provided with a bolster 11. The bolster carries a center plate 12 and rollers 13 near the ends for engaging the plate of the car to be connected to the truck frame 10. The truck frame carries near each corner a dented roller 14 which bears on a correspondingly dented track 15 provided above the journal boxes 16 of the wheel frame 17. The two wheel frames are coupled by a toggle joint 18 which is co-axial with the king bolt of the car and which joint allows a relative movement of the two wheel frames in a plane transverse to the movement of the truck frame on the king bolt and whereby the axles 19 may converge or diverge when swinging a curved track.

One of the wheel frames is provided with an arm 20 which extends through the central part of the wheel frame transversely of the axle 19 with the free end thereof disposed toward the other wheel frame. The arm 20 is connected by a bolt or pivot 21 to a transom 22 of the truck frame 10 so that the axis of the pivot 21 passes through the axis of the axle 19. The other frame has a brace 20' which is connected to the transom 22' of the truck frame by a bolt 21' disposed similarly to the bolt 21. The end of the arm is depressed below the bolster 11 to pass above and below the joint 18, for which it constitutes a guide, and prevents a relative vertical movement between the two wheel frames at the joint. The end of the lever is further guided by a transverse member 23 which is supported from the wheel frame 17. The end of the lever is coupled to a rod 24 by a pin 25. The said rod is in turn pivoted to a brace 26 of the truck frame by a bolt 27 which is co-axial with the king bolt of the truck.

The other end of said rod is similarly connected to the truck frame and arm of the other truck of the same car. The rod 24 is provided with means 28 whereby the length thereof may be varied for the purpose of taking up wear or for adapting itself for varying distances between the truck frames of the same car. As the wheels of a wheel frame ride over a curved track they automatically move the wheel frame so that the axle 19 becomes radial. In consequence the coöperating wheel frame is swung, due to the joint 18 and also due to the connection of the arm 20 with the rod 24 (see Fig. 5). This brings the axle of said coöperating wheel frame radial to the curved track. As the wheel frames of the same truck move relative to one another the truck frame rides on the tracks 15 and helps to maintain a proper relation between the wheel frames. As the first truck swings the curve the rod 24 operates the arm 20 of the other truck, displacing the wheel frame connected therewith and bringing the axle thereof radial to the curved track. The displacement of the wheel frame connected to the arm is transmitted to the coöperating wheel frame through the medium of the joint 18, bringing the axle of the coöperating wheel frame radial to the curved track. It will be noted that the convergence or divergence of the axles of the truck are automatic and controlled directly by the curved track. In consequence of this the friction between the flanges of the wheels and the rails is reduced to a minimum and thereby wear and tear on the track and trucks is reduced to a minimum.

To further improve the rolling movement of the trucks the wheels 29 are each provided with an inside splay tread 30 so pitched as to vary for the different sizes of curves, thus giving the correct diameter to the inside wheel in ratio to the outside wheel upon the curve, thereby eliminating abrasion on top of the inside rail and wheel due to the even diameters of both wheels as heretofore used, also relieving the outside flange, rail and wheel. In connection with the inside tread there is provided a special rail 31 (see Fig. 3) the ball of which is convex and pitched so as to correspond to the diameter of the tread for any certain radius of the curved track, and, at the same time, intersect with the straight track at the junction of all curves. This arrangement will eliminate all friction and give perfect traction.

To further reduce friction on a curve lubricators 32 are suspended from the wheel frames 17 to swing in a substantially horizontal plane to and from the wheels 29. The swinging of each lubricator is controlled from the truck frame 10 by an adjustable connection 33 which extends from the bell-crank lever 34 of each lubricator to a corresponding arm 35 depending from the truck frame 10. It will be noted from Fig. 5 that when the truck strikes a curved track the outer lubricators are brought against the flanges of the wheels, applying lubricant thereto and thereby decreasing resistance. This application is automatic, as will be noted. It is only necessary to maintain the lubricator filled with lubricant.

All the truck springs have been eliminated so as not to obstruct the truck structure. The brake mechanism has also been eliminated for the same reason.

A car equipped with trucks as described will decrease the up-keep cost of curves in tracks; it will be substantially noiseless, due to the fact that there will be no grinding between the rails and the wheel flanges; it will eliminate derailment on the curves, due to the automatic action of the truck in converging the wheel axles to bring the axles radial with the curve; it will lessen the strain on the draft gear, and eliminate spreading of rails on curves. This truck is adaptable to single-truck cars when coupled together, or when operating what is known as the articulated type. The truck is interchangeable and can be locked and transformed into a rigid type at a moment's notice by locking the radial arm or control.

While I have described the principle of operation, together with the device which I now consider to be the best embodiment thereof, I desire to have it understood that the device shown is merely illustrative and that such changes may be made as are within the scope of the appended claims.

I claim:

1. A car truck, comprising a truck frame, wheel frames coupled to each other and to the truck frame to swing in a plane substantially parallel to a track to be engaged by the truck, wheels carried by the wheel frames, lubricators carried by the wheel frames for the wheels, and means connecting the lubricators to the truck frame to move said lubricators against the wheels which diverge from each other when the wheel frames swing.

2. A car truck, comprising a truck frame, wheel frames pivoted to the truck frame in the longitudinal axis thereof to swing in a plane substantially parallel to the track to be engaged by the truck, means coupling the wheel frames for transmitting the swinging movement from one wheel frame to the other, wheels carried by said wheel frames, lubricators pivotally mounted on the wheel frames in proximity of the wheels, and means connecting each of the lubricators to the truck frame so as to swing the lubricators against the diverging wheels in the wheel frames when the wheel frames swing relative to one another.

3. In combination, a pair of car trucks, each comprising a truck frame, wheel frames, means coupling the wheel frames to each other in the longitudinal axis of the truck, means pivotally connecting the wheel frames to the truck frame in the longitudinal axis of the truck frame, an arm extending from one of the wheel frames toward the other; a rod extending between the two truck frames, means connecting the rod to each truck frame at a point in vertical alinement with the means coupling the wheel frames, and means pivotally connecting each of the arms to the rod.

4. In combination, a pair of car trucks each comprising a truck frame, wheel frames pivoted to the truck frame in the longitudinal axis thereof to swing in a plane substantially parallel to the track to be engaged by the truck frames, each of said car trucks having a bolster, a king bolt to be carried by the bolster, means coupling the wheel frames normally disposed in vertical alinement with the king bolt, an arm extending from one of the wheel frames toward the other of the same truck, and a rod extending between the truck frames and pivotally connected to the free end of the arm of each truck and to each truck frame at a point co-axial with the king bolt.

5. A car truck, comprising a truck frame, wheel frames mounted to swing in the truck frame to take a radial position relative to a curve of a track, lubricators suspended from the wheel frame, and means connecting the lubricators to the truck frame to move said lubricators against the wheels when the wheel frame moves to a radial position.

6. A car truck comprising a truck frame, wheel frames secured to the truck frame to swing in a plane substantially parallel to a track to be engaged by the truck, wheels carried by the wheel frames to swing with the wheel frames, lubricators mounted to swing in the wheel frames, and means connecting the lubricators to the truck frame to swing said lubricators to and from the wheels in the swinging movement of the wheel frames.

7. In combination, a pair of car trucks each comprising a truck frame, wheel frames pivoted to the truck frame to swing in a plane substantially parallel to a track to be engaged by the trucks, a bolster on each of said truck frames, a king bolt associated with the bolster, an arm extending from one of the wheel frames toward the other of the same truck, and means pivotally connected to the free end of each arm and to each truck frame at a point coaxial with the king bolt.

8. A car truck comprising a truck frame having a king bolt, wheel frames coupled to each other and to the truck frame to swing in a plane substantially parallel to a track to be engaged by the truck, an arm extending from one of the wheel frames to the other, means pivotally connecting said arm to the truck frame below the frames, said connection of said means to the truck being coaxial with the king bolt.

9. A car truck comprising a truck frame, wheel frames coupled to each other and to the truck frame to swing in a plane substantially parallel to a track to be engaged by the truck, each of said wheel frames presenting a roller-bearing surface to the truck frame and a toothed surface in proximity of the roller-bearing surface, and means carried by the truck frame for engaging the toothed surface and said rolling surfaces.

NEWMAN PYNN.